June 11, 1935.  T.J. SILBER  2,004,224

DRIVING MEANS FOR ELECTRIC GENERATORS

Filed Jan. 15, 1934

INVENTOR:
Tj SILBER
BY David O. Barnell
ATTORNEY

Patented June 11, 1935

2,004,224

UNITED STATES PATENT OFFICE 2,004,224

DRIVING MEANS FOR ELECTRIC GENERATORS

Tj. Silber, Omaha, Nebr., assignor of one-fourth to J. D. Goodrich, one-fourth to D. B. Marshall, and one-fourth to Ray Sorenson, all of Omaha, Nebr.

Application January 15, 1934, Serial No. 706,747

9 Claims. (Cl. 74—242.22)

My invention relates broadly to power transmitting devices, but is especially suited for use in connection with electric generators driven from a source of which the speed is subject to great variation, as, for example, battery-charging generators on motor-vehicles, where the generator is driven directly from, and thus ordinarily at a speed constantly proportional to that of, the engine or motor which drives the vehicle. It is the object of my invention to provide a driving means in which the speed ratio of the driving and driven elements is changed automatically at certain critical speeds, the change of ratio tending to make the speed of the driven element more nearly uniform, or to have less variation than that of the driving element. Driving means functioning in the foregoing manner is especially desirable for the generators on motor-vehicles which employ "freewheeling" power transmission mechanism, and when so used enable the generator to be operated at a "charging" speed when the motor is idling, without causing the speed of the generator to be excessive when the motor is operating at its higher speeds.

Figure 1:
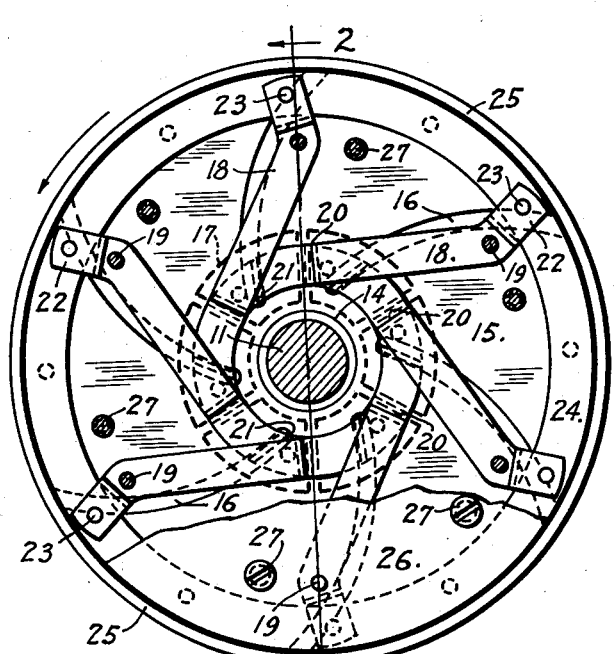
Figure 2:
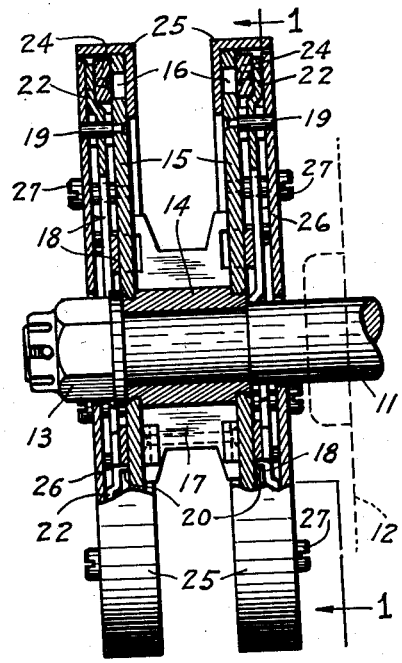
Figure 3:
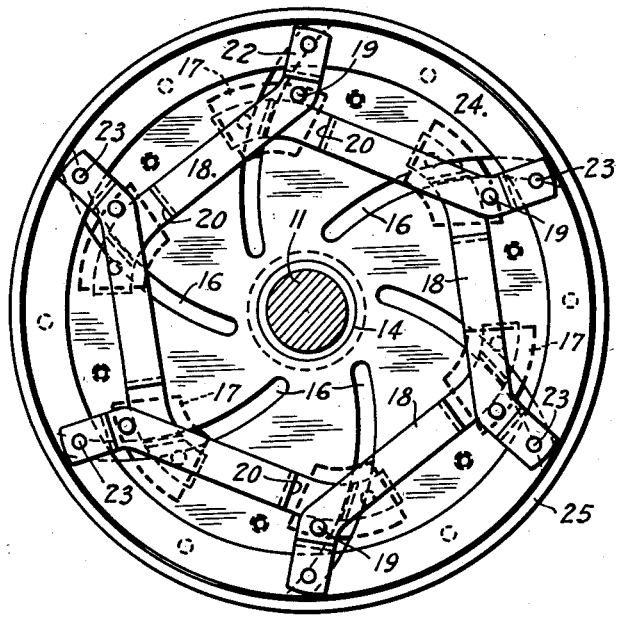
Figure 4:
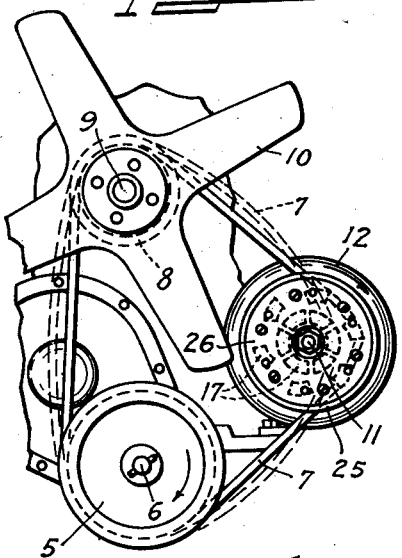

In the accompanying drawing, Fig. 1 is a side view of a centrifugally expansible pulley suitable for carrying out my invention, a side cover-plate of the pulley structure being partly broken away, Fig. 2 is an axial section on the line 2—2 of Fig. 1, Fig. 3 is a view similar to Fig. 1, but showing the members in expanded position, and Fig. 4 is a front view showing the expansible pulley as applied to the generator on an automotive engine.

In the illustrated structure, the expansible pulley is of the grooved or sheave type, being adapted to receive a V-belt such as is employed commonly on automotive engines for driving the cooling-fan, water-circulating pump, and battery-charging generator. A typical arrangement of the foregoing parts is shown in Fig. 4, wherein the driving-sheave 5 is carried by the main-shaft 6 of the engine, the belt 7 extending from said sheave 5 about the sheave 8 on the pump-shaft 9 which carries also the fan 10, and from said sheave 8 the belt extending to the sheave on the generator-shaft 11 and thence returning to the drive-sheave 5. The shaft 11 which extends forward from the generator-housing 12, is shown as shouldered and provided with a nut 13 by which the hub-member 14 of the expansible sheave-structure is retained upon the shaft. To the shouldered ends of the hub-member 14 are secured a pair of parallel disks 15 having therein the series of arcuate slots 16 extending in from their outer edges, as shown. Between said disks 15 are the peripherally grooved sector-blocks 17 which form the movable segments or sections of the expansible sheave, and which are directly engaged by the drive-belt 7. For each sector-block 17 there is provided a pair of arms 18 which are mounted on pivot-pins 19 extending from the sides of the disks 15. At the pivot-pins the arms are slightly spaced outwardly from the disks, and each arm extends into lapping relation with the next arm of the series, there being an inward offset or shoulder 20 in each arm, so that the terminal portion of the arm may pass under the next one. In the terminal portion of each arm there is a second inward offset or shoulder 21 extending through the arcuate slot 16 which is concentric with the pivotal axis of the arm, and the end of the arm is affixed to the sector-block adjoining the slot. Each arm 18 has a portion 22 which extends outwardly from the pivot-pin 19, and said extended portion of the arm is connected pivotally with a pin 23 on a master-ring 24 arranged adjoining the peripheral portion of the disk 15. About each of the disks 15 there is disposed an L-ring 25 having a radial flange at the inner side of the respective disk and an axial flange extending out over the peripheral edge of the disk. Within the outer portion of said axial flange of the L-ring 25 is disposed a cover-plate 26 which is held in place by a plurality of screws 27 extending through the plate into the adjacent disk 15. The outer ends of the pivot-pins 19 extend into suitable openings therefor in the cover-plates. In Fig. 3 the cover-plate at the adjacent side of the structure is fully removed to show the underlying parts, and in Fig. 1 all but the lower portion of the cover-plate is broken away.

Comparing Figs. 1 and 3, it will be seen that, by pivotal movement of the arms 18 about the several pivot-pins 19, the sector-blocks carried by the arms are movable from the closed or normal positions thereof shown in Figs. 1 and 2 to the expanded positions indicated in Fig. 3, and that in the normal positions the series of sector-blocks form a sheave of small diameter, while in the expanded positions the sector-blocks comprise elements of a sheave much larger in diameter than that formed by the blocks in normal position. It will be seen also that during movement of the parts between the normal and expanded positions, the extended arm-portions 22 at each side of the structure are constrained by the master-rings 24 to move in unison, so that either outward or inward movement of all of the sector-blocks must occur simultaneously. It will also be seen that, as the ends of the arm-portions 22 which fit upon the pins 23 move in arcuate paths about the axes of the pins 19, said pins 23 must be moved slightly outward radially of the sheave-axis during the swing of the arms past the intermediate position at which the axes of the pins 19 and 23 are in line radially of the sheave-axis. To enable such radial displacement of the pins 23, the master-rings are made of material sufficiently resilient to permit a polygonal distortion thereof by the outward pressure upon the pins 23. The inward spring-pressure of the master-rings upon the pins 23 tends to retain the arms and sector-blocks in either of the extreme positions to which the same are movable, said spring-pressure resisting displacement of the parts from either position until the intermediate or dead-center position of the pins 19 and 23 is reached, and then becoming effective to aid the movement to the opposite extreme.

The operation of the described expansible sheave structure for controlling the speed of a generator, may be readily understood by reference to Fig. 4. The belt 7, employed in the illustrated structure, is relatively thick and heavy, and tends to assume a circular formation, so that even when the belt is quite loose it will engage operatively the sheaves on the triangularly disposed shafts 6, 9 and 11. Thus, when the sector-blocks of the generator-sheave are in their normal unexpanded positions, the portions of the belt intermediate the sheaves are bowed outwardly as indicated by the dotted lines in Fig. 4 and the speed ratio of the shaft 11 to the shaft 6 is proportional to the effective diameters of the sheave 5 and of that formed by the sector-blocks 17. In commercial use it is found practicable to have the small diameter of the variable sheave about one-third that of the driving-sheave 5, so that at an average idling-speed of 300 R. P. M. for the engine-shaft 6, the speed of the generator-shaft will be about 900 R. P. M., or well above the minimum required for causing charging of batteries. When the speed of the driving-sheave 5 is increased, the speed of the generator-shaft is correspondingly increased until a critical speed is attained at which the expansion of the generator-sheave takes place. Said critical speed is determined by the centrifugal force of the sector-blocks 17, depending upon the weight and radius of gyration thereof, said centrifugal force being opposed by, (a) the tension of the belt 7 upon the sector-blocks, and (b) the spring-tension of the master-rings exerted upon the sector-blocks through the arms 22 and 18. When the critical speed is attained and the expansion of the sheave occurs, the increase of its effective diameter causes a corresponding reduction of speed of the generator-shaft 11 relative to that of the shaft 6, and the generator-speed is thus prevented from becoming excessive at the higher engine-speeds. The sheave, having expanded to the larger diameter, remains in expanded formation until the engine-speed is again lowered toward the idling rate thereof, and during such speed-lowering phase of the operation a critical speed is attained at which the tension of the belt 7, exerted inwardly upon the sector-blocks 17, becomes effective to force said blocks in to their normal or closed positions, whereupon operation of the generator is resumed at the higher speed relative to that of the engine-shaft. The centrifugally expansible sheave thus serves to govern automatically the speed of the generator, causing the same to be relatively accelerated when the engine-speed falls below a critical minimum, and causing the generator-speed to be relatively lowered when the engine-speed exceeds a critical maximum. By employing the described mechanism on motor vehicles having "free wheeling" transmission, it is possible to make full use of the free wheeling drive of the vehicle, without liability of allowing the battery-charge to become low through failure of the generator to deliver a charging voltage during times when the engine is idling, and without securing the foregoing effect by adoption of a generator-drive ratio such as to cause an excessive speed of the generator at the higher speeds of the engine.

Now, having described my invention, what I claim and desire to secure by Letters Patent is:

1. In a structure of the class described, a centrifugally expansible pulley comprising a hub-member, parallel disks carried thereby, a series of belt engaging members disposed movably between said disks and normally adjacent to the hub-member, a series of arms connected pivotally with said disks and with the respective belt-engaging members and constraining centrifugal expansive movements of the latter to arcuate paths about the pivotal axes of the respective arms, and master-rings connecting the series of arms and controlling the pivotal movements thereof.

2. In a structure of the class described, a centrifugally expansible pulley comprising a hub-member, axially spaced parallel disks carried thereby, series of arms mounted pivotally on said disks, resilient master-rings connected with the several arms on each disk and constraining the same to simultaneous pivotal movements about the axes thereof, and belt-engaging pulley-segments positioned between the disks and affixed to the pivoted arms for movement outwardly to expanded positions from normal positions adjoining the hub-member, the resilient master-rings being adapted and arranged to oppose initial movement of the parts from normal toward expanded positions.

3. The combination with a belt and a driving pulley therefor, of an expansible pulley operatively engaged and driven by the belt, said expansible pulley comprising a plurality of members positioned normally to form a substantially circular belt-engaging body and movable outwardly centrifugally from said normal position to expanded positions in which said members form elements of a belt-engaging body of larger diameter than the first, and means controlling the centrifugal movement of said members, said means operating to resist the expansion of the members up to a point intermediate of the limits of movement of said members and to aid the expansion thereof beyond said intermediate point.

4. In a structure of the class described, a centrifugally expansible pulley comprising a hub-member, plurality of sector-blocks disposed uniformly about said hub-member and forming normally a belt-engaging body of small diameter, means connecting said hub-member and sector-blocks and controlling movement of the latter centrifugally outward from the hub-member to expanded positions, and means connecting the several sector-blocks to effect uniform movement thereof, said means operating to resist the expansion of the sector-blocks up to a point intermediate of the extreme limits of movement of said blocks and to aid the expansion thereof beyond said intermediate point.

5. Means for driving an electric generator from a source of power subject to wide variations of speed, comprising a pulley connected with said source of power, a belt driven by said pulley, and a pulley driven by the belt and connected with the generator, said latter pulley comprising a hub-member, plurality of sector-blocks disposed uniformly about said hub-member and adjacent thereto and forming normally a belt-engaging body of small diameter, said sector-blocks being movable from and toward the hub-member to vary the effective diameter of the pulley, and means connecting the several sector-blocks to effect uniform movement thereof and operating to resist the expansion of said sector-blocks up to a point intermediate of the limits of movement thereof and to aid the expansion thereof beyond said intermediate point.

6. Means for driving an electric generator from a source of power subject to wide variations of speed, comprising a pulley connected with said source, a belt driven by said pulley, and a centrifugally expansible pulley comprising a hub-member, parallel disks carried thereby, a series of belt-engaging members disposed movably between said disks and normally adjacent to the hub-member, a series of arms connected pivotally with said disks and with the respective belt-engaging members and constraining centrifugal expansive movements of the latter to arcuate paths about the pivotal axes of the respective arms, and master rings connecting the series of arms and controlling the pivotal movements thereof, said ring operating the arms to urge the belt-engaging members inwardly against the hub-member when the pulley rotates below a critical low speed and operating the arms to urge the belt-engaging members outwardly when the pulley rotates above a critical high speed.

7. In a structure of the class described, a centrifugally expansible pulley comprising a hub-member of relatively small diameter, a plurality of sector-blocks disposed uniformly about the hub-member and immediately adjacent thereto to normally form a belt-engaging body of relatively small diameter, means connecting the hub-member and sector-blocks and controlling the movement of the latter centrifugally outward from the hub-member to expanded positions, said means being disposed laterally of the sector-blocks to permit the disposition of said blocks, when in the contracted position, immediately adjacent the hub-member, and means connecting the several sector-blocks to effect uniform movement thereof.

8. In a structure of the class described, a centrifugally expansible pulley comprising a hub-member of relatively small diameter, a plurality of sector-blocks disposed uniformly about the hub-member and adjacent thereto to normally form a belt-engaging body of relatively small diameter, means connecting the hub-member and sector-blocks and controlling the movement of the latter centrifugally outward from the hub-member to expanded positions, said means being disposed laterally of the sector-blocks to permit the disposition of said blocks, when in the contracted position, adjacent to the hub-member, and means connecting the several sector-blocks to effect uniform movement thereof, said means operating to resist the expansion of the sector-blocks up to a point intermediate of the extreme limits of movement of said blocks and to aid the expansion thereof beyond said intermediate point.

9. In a structure of the class described, a centrifugally expansible pulley comprising a hub-member of relatively small diameter, a plurality of sector-blocks disposed uniformly about the hub-member and adjacent thereto to normally form a belt-engaging body of relatively small diameter, means connecting the hub-member and sector-blocks and controlling the movement of the latter centrifugally outward from the hub-member to expanded positions, said means being disposed laterally of the sector-blocks to permit the disposition of said blocks, when in the contracted position, adjacent to the hub-member, and stop means for limiting the outward expansion of the sector-blocks and adapted to assume, at high pulley speeds, the centrifugal pressure of said blocks to relieve the means connecting the hub-member and sector-blocks from said centrifugal pressure.

TJ. SILBER.